April 1, 1958     L. C. BRISSON     2,828,835
TRANSVERSELY EXPANDING TYPE WHEEL BRAKE
Filed Jan. 19, 1954     3 Sheets-Sheet 1
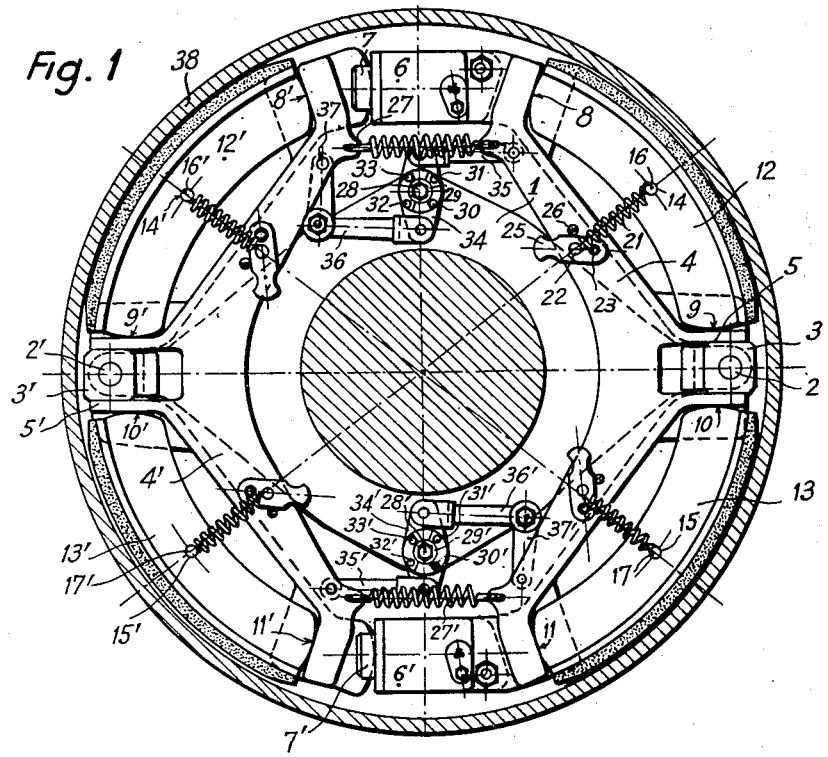
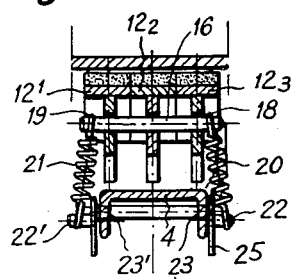
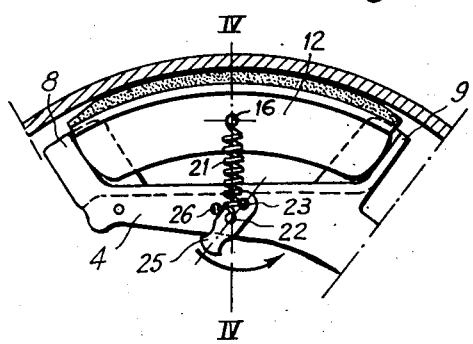

April 1, 1958      L. C. BRISSON      2,828,835
TRANSVERSELY EXPANDING TYPE WHEEL BRAKE Filed Jan. 19, 1954      3 Sheets-Sheet 2

April 1, 1958 L. C. BRISSON 2,828,835
TRANSVERSELY EXPANDING TYPE WHEEL BRAKE
Filed Jan. 19, 1954 3 Sheets-Sheet 3

INVENTOR
LOUIS C. BRISSON
BY
ATTORNEY

United States Patent Office 2,828,835
Patented Apr. 1, 1958

2,828,835

TRANSVERSELY EXPANDING TYPE WHEEL BRAKE

Louis Charles Brisson, Vineuil, France, assignor to Societe Anonyme dite: Compagnie des Freins et Signaux Westinghouse, Paris, France Application January 19, 1954, Serial No. 405,010

Claims priority, application France October 27, 1953

2 Claims. (Cl. 188—78)

This invention relates to vehicle brakes, although being concerned with vehicle brakes in general, is especially concerned with the braking of vehicles with wheels guided by rails or runways involving special features for correcting deficiencies found in vehicles now in use, as follows:

(1) The regularity of action of the brake (as a function of the variations in the coefficient of friction of the linings) must be as great as possible;

(2) The effective force for operation of the brake need not be very great, since servo-control arrangements are always available;

(3) Maintenance requirements must be as low as possible;

(4) The brake must be generously dimensioned, and the equalization of the pressures at all points of the linings must be as good as possible;

(5) The dismantling of the segments for the changing of the linings, and otherwise, must be capable of being effected without requiring the time consuming and onerous operation of dismantling the wheels and the brake drums;

(6) The brake must have exactly the same characteristics for both directions of running, corresponding to forward and reverse movement of the vehicle.

The present invention has for its purpose to provide a construction which enables these requirements to be satisfied in a simple manner.

According to the present invention one feature of which is the provision of a vehicle brake arrangement comprising a fixed support on which are movable brake-segment carriers each carrying a plurality of independent brake segments which are spaced apart to engage different angularly separated parts of a brake drum, and means to move the carriers apart to bring the segments into brake-applying engagement with the brake drum.

The segments are preferably arranged so as to be free to float in the radial sense of the carriers, stops being provided on the carriers to hold the segments against movement in the sense of rotation of the drum.

According to a further feature of the invention the segments are received in recesses or pockets of the carriers, the segments normally being held in position by means which can be operated to release the segments to enable them to be withdrawn laterally from the recesses.

According to a further feature of the invention an operating mechanism incorporates means which automatically adjust the initial setting of the carriers to compensate for wear on the brake segments.

Other features and advantages of the present invention will appear from the following description, with reference to the accompanying drawings, which illustrate diagrammatically one embodiment of the invention.

In the drawings, Figures 1 and 2 are transverse sections of a brake according to the invention, Figure 1 showing the brake "off" and Figure 2 the brake applied with linings which are partially worn.

Figure 3 is a view similar to Figure 1, but showing only a single brake segment and its associated parts.

Figure 4 is a section on the line IV—IV of Figure 3.

Figure 2:
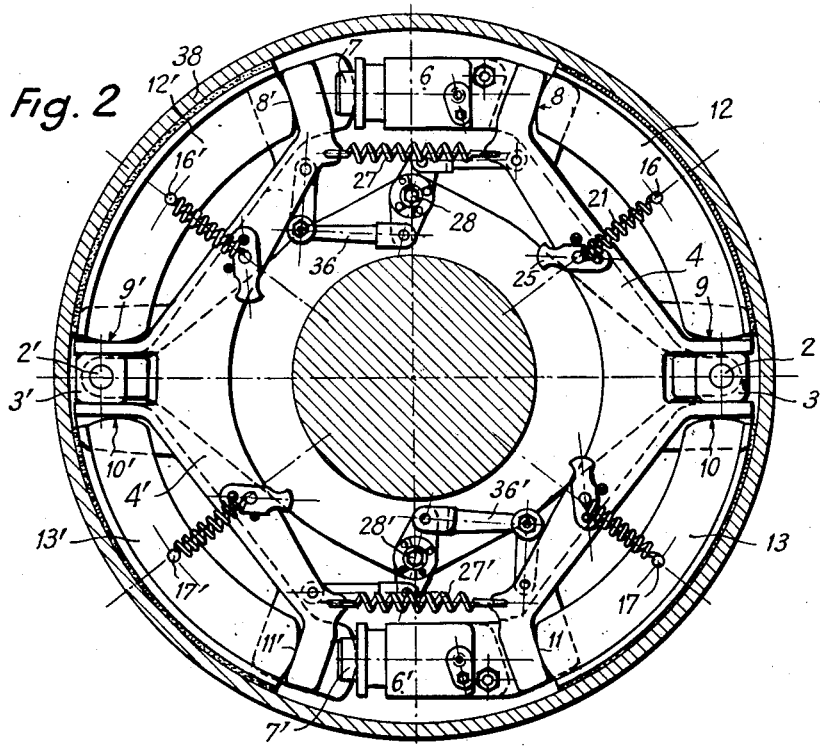

As will be seen from Figures 1 and 2, the brake is constituted by a support 1 fixed in any usual manner on the fixed part of the axle of a vehicle, this support comprising two pins 2 and 2' upon which there are pivoted two bearings 3 and 3', two segment-carriers 4 and 4' respectively having between their ends rectangular slots 5 and 5' the walls of which are slidable on the bearings 3 and 3'.

On the ends of the segment-carrier 4 are fixed the hydraulic wheel cylinders 6 and 6' of a hydraulic braking system the pistons 7 and 7' of the wheel cylinders bearing against the ends of the segment carrier 4'.

The segment carriers 4 and 4' are formed with segment-receiving pockets the end walls of which constitute stops 8—9, 10—11, 8'—9'—10'—11', against which bear the ends of brake segments 12, 13, 12', 13'; it is possible as is shown for each segment to be divided, in the direction of its width, into a plurality of sections: for example in Figure 4 the segment 12 is shown as comprising sections at $12_1$, $12_2$, $12_3$.

The segments 12, 13, 12', 13' are T shape and in the webs of the T's are formed holes 14, 15, 14', 15' to receive freely pins 16, 17, 16', 17' having at each end circular grooves 18 and 19 (Figure 4) upon which there are mounted the loops of springs 20, 21. The other ends of the springs 20, 21 are mounted respectively on pins 22, 22' on control levers 25 carried by pivot pins 23, 23' in the segment-carriers 4, 4', the pins 22, 22' being disposed eccentrically to the pins 23, 23'. The movement of the levers 25 is limited by stops 26 fixed on the segment-carriers 4, 4'. Two return springs 27, 27' connect the two segment carriers 4 and 4'.

On the support 1 are fixed two pins 28 and 28' forming pivots for two sleeves 29 and 29' the pivotal movement of which is limited by the stops 30, 31, 32, 33, 30', 31', 32', 33'. On the sleeves 29 and 29' are frictionally mounted levers 34 and 34'. The lever 34 is connected on the one hand to the segment-carriers 4' by the connecting rods 36 and 37 which are frictionally pivoted together, and on the other hand to the segment carrier 4 by the connecting rod 35. The lever 34' is connected on the one hand to the segment-carrier 4' by the connecting rod 35' and on the other hand to the segment-carrier 4 by the connecting rods 36' and 37' which, like the rods 36, 37 are frictionally pivoted together.

The whole assembly is mounted in a drum 38 arranged to be secured to a wheel.

In operation when hydraulic pressure is transmitted to the wheel cylinders 6 and 6', the two segment-carriers 4 and 4' move, or tend to move, in opposite directions (i. e.) away from one another, the carriers by virtue of their grooves 5 and 5' sliding along the bearings 3 and 3' pivoting on the fixed support 1.

The segments 12, 13, 12', 13' thus are caused to contact with the brake drum 38. If the usual calculation of such a brake is carried out, it will be found that the contact pressures along all the segments differ very little, especially as a result of the division in the longitudinal direction of the segments into sections as has been described. The fact that the various segments (or their sections) are free to slide between the stop walls 8, 9 etc. of the pockets and that their ends, being curved as shown, they are free individually to make a slight angular movement, ensures that the various segments shall be self-accommodating or free to float on the radial sense to produce the desired effect of evenness of load and wear over the entire braking area of the segments.

Furthermore, irrespective of the direction of rotation, the segments receive substantially the same load.

The regularity or uniformity of action of the brake as a function of the variations in the coefficient of friction of the linings is superior to that of all usual brakes.

The movement of the segment-carriers 4 and 4' in the direction of brake application causes the sleeves 29 and 29' to be rotated through the connecting rods 35, 36, 37 and 35', 36', 37' until these sleeves 29 and 29' abut against the stops 31, 32 and 31', 32'. If at this moment the brake is not fully applied, and the movement of the segment-carriers continues, the levers 34 and 34' rotate frictionally with respect to the sleeves 29 and 29'. The frictional force between the sleeves 29, 29' and the levers 34, 34' being greater than the action of the return springs 27 and 27', then, when the brake is released the levers 34 and 34' act as if they were fast with the sleeves 29 and 29'. Thus the latter rotate about their pins 28 and 28' until they again come into contact with the stops 30, 33 and 30', 33'. At this time the withdrawal or release movement of the segment-carriers is stopped, and the brake being actuated by a conventional open-circuit hydraulic transmitter, the taking up of play is effected automatically. The friction between the levers 36—37 and 36'—37' has the effect of equalising the play between the two groups of segments 12—13 and 12'—13'.

The dismantling of the segments can easily be effected without dismantling the wheels and the drums in the following manner.

Figures 5, 6:
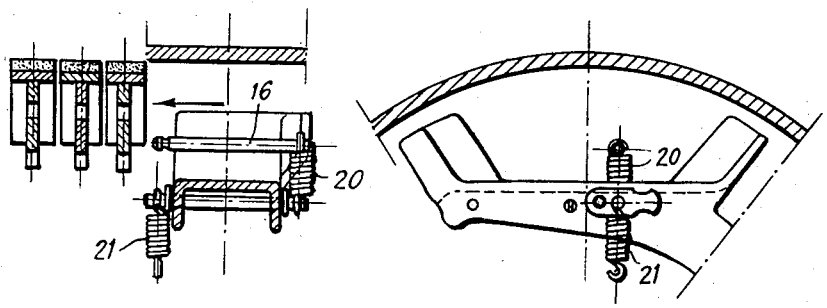
Figure 5 is a view similar to Figure 3, but with the segment removed.
Figure 6 is a view similar to Figure 4, but showing the segment during the operation of dismantling.
Figure 7:
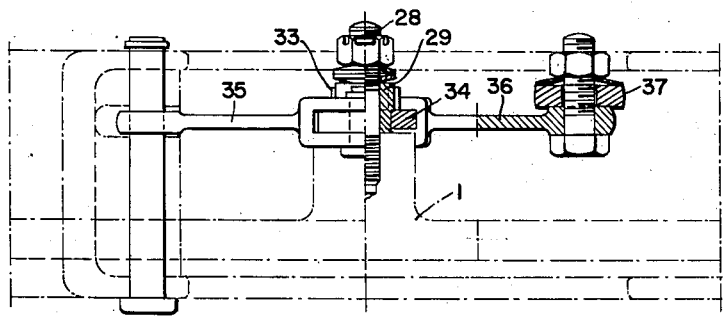
Figure 7 is a sectional view of the slack adjuster of the brake taken approximately along the line 7—7 of Figure 8.
Figure 8:
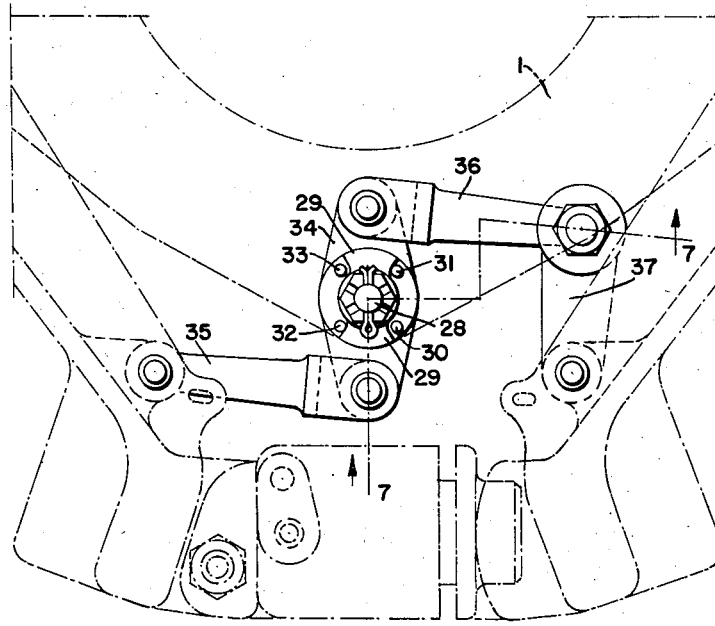
Figure 8 is an enlarged detail view of the upper central portion of Figures 1 and 2 (reversed) in braking position.
Figure 9:
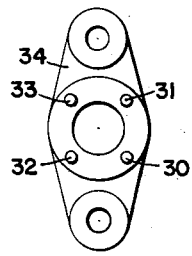
Figure 9 is a plan view of one of the link elements shown in Figs. 7 and 8.
Figure 10:
Figure 10 is a similar view of a sleeve element which cooperates with the element shown in Figure 9 to provide a pivot for the linkage illustrated on an enlarged scale in Fig. 8.

By moving the lever 25 (associated with the segment to be removed) in the direction of the arrow (Figure 3) the springs 20 and 21 operating on the appropriate segment are relaxed, enabling the spring 21 to be freed easily from the corresponding pin 16, 16', 17, 17' as the case may be. The sections of the segment can now be drawn out by hand, as is shown in Figure 6, leaving the segment-carrier in the position shown in Figure 5.

What I claim is:

1. A vehicle brake arrangement comprising a support, a drum mounted on said support, brake segment carriers slidable on said support and each provided with a plurality of bearing parts, brake segments each mounted between two of said bearing parts of each of said carriers, a guiding member mounted on said support for guiding the sliding movement of said carriers relatively to said support, return springs between each brake segment and its carrier, each spring being attached by one of its ends to each segment and by the other of its ends to a lever pivotally mounted on said carrier and capable of assuming a first position in which the spring is under tension and a second position in which the tension of said spring is released and means for moving said carriers apart to bring the braking segments into brake applying engagement with the brake drum.

2. A vehicle brake arrangement comprising a support, a drum mounted on said support, brake segment carriers slidable on said support and each provided with a plurality of bearing parts, brake segments each mounted between two of said bearing parts of each of said carriers, said segments being formed from a plurality of elements assembled in laterally adjacent relationship coaxially aligned in relation to said drum to form a wide segment, a guiding member mounted on said support for guiding the sliding movement of said carriers relatively to said support, and means for moving said carriers apart to bring the braking segments into brake applying engagement with the brake drum.

References Cited in the file of this patent

UNITED STATES PATENTS

| 707,232 | House | Aug. 19, 1902 |
| 2,040,200 | Charles et al. | May 12, 1936 |
| 2,265,999 | Cadman | Dec. 16, 1941 |
| 2,271,815 | Cowell | Feb. 3, 1942 |

FOREIGN PATENTS

| 767,742 | France | May 7, 1934 |